United States Patent Office 2,782,092
Patented Feb. 19, 1957

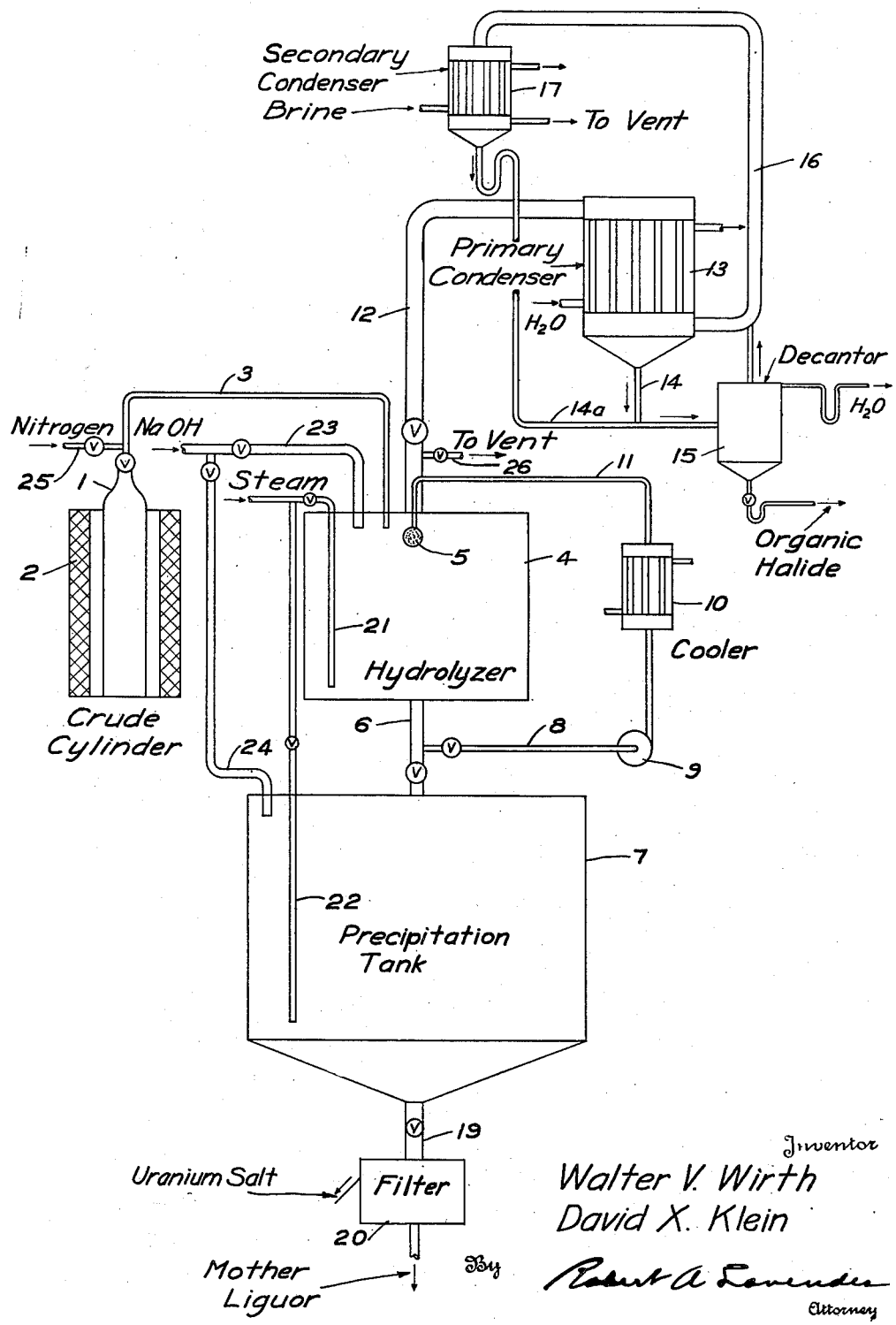

2,782,092
RECOVERY OF METAL SALTS FROM MIXTURES

David X. Klein, Wilmington, Del., and Walter V. Wirth, Woodstown, N. J., assignors to the United States of America as represented by the United States Atomic Energy Commission Application April 12, 1945, Serial No. 588,064

12 Claims. (Cl. 23—14.5)

This invention relates to the separation of uranium hexafluoride from organic halides. In certain processes involving the treatment of uranium hexafluoride in the presence of volatile organic halides, mixtures of uranium hexafluoride with substantial proportions of the organic halide are obtained.

An object of the present invention is to accomplish the separation of such organic compounds from uranium hexafluoride and to recover the organic compounds for reuse. A further object of the invention is to recover uranium values from such mixtures in a form which can be handled more easily and with less danger than the uranium hexafluoride. Further objects of the invention will appear from the following description thereof.

In accordance with the invention, a uranium hexafluoride mixed with a water-insoluble, volatile organic halide is hydrolyzed in an aqueous medium to convert the uranium hexafluoride to uranyl fluoride. The organic halide is then separated from the aqueous uranyl fluoride solution and the uranium is subsequently recovered from the aqueous solution.

The process of the invention is especially useful for the separation of volatile halogenated hydrocarbons such as perfluoro - dimethyl - cyclohexanes, perfluoro - heptane, and monochloro - perfluoro - heptanes from uranium hexafluoride. It may be applied to separation of other water-insoluble, organic halides compatible with uranium hexafluoride, e. g., monochloro - perfluoro - dimethyl-cyclohexanes, dichloro - perfluoro - heptanes, perfluoro-methylcyclohexane, perfluoro-ethylcyclohexane, perfluoro-ethylcyclopentane, monochloro-perfluoro-ethylcyclopentanes, and monochloro-perfluoro-ethylcyclohexanes. In other words, this invention is of particular utility in the separation of saturated perhalocarbons containing from 7 to 8 carbon atoms in which the halogen substituents are selected from the group consisting of fluorine and chlorine and which contain no more than 2 chlorine atoms per molecule from mixtures of said perhalocarbons with uranium hexafluoride.

The hydrolysis may be effected in acidic, neutral or alkaline solution. Since conduct of the hydrolysis in acid solution results in the formation of hydrogen fluoride, which is highly corrosive, it is preferred to carry out the hydrolysis in the presence of sufficient alkaline reagent to maintain the solution neutral or slightly alkaline, for example at a pH between 7 and 8. The alkaline reagent may be supplied continuously or in small increments or all at once. In the latter cases the pH of 8 may be temporarily exceeded during addition of the UF₆.

The separation of organic halide from the aqueous solution may be effected by decantation, centrifugation or distillation. Distillation is aided by the steam formed from the aqueous solution and effects a very complete removal of the organic halides normally employed in processes of the type under consideration. Consequently this is the preferred method of separating such organic halides from the solution.

The recovery of uranium values from the solution after separation of organic halides may be effected by precipitation of the uranium as an alkaline uranate, e. g., an alkali-metal, ammonium or alkaline earth metal uranate, or as uranium tetrafluoride. Precipitation as an alkaline uranate requires only an adjustment of the pH of the solution to a value of about 10 or more. Precipitation of the uranium as uranium tetrafluoride or complexes thereof may be effected in acid solution by means of a reducing agent such as tin or stannous chloride, aluminum, or hyposulfurous acid.

When the hydrolysis is effected in neutral or alkaline solution, it is preferred to precipitate uranium as an insoluble uranate rather than tetrafluoride since the presence of alkali-metal ions in the solution has a tendency to cause formation of complex salts of tetravalent uranium.

The hydrolysis of the invention may be carried out satisfactorily at ordinary temperatures or at elevated temperatures. The hydrolysis generates substantial quantities of heat and when conducted in alkaline solution generates still more heat as a result of the neutralization of evolved hydrogen fluoride. Consequently the provision of cooling means for controlling the reaction temperature is desirable. The precipitation of uranium as sodium uranate provides a more easily filterable precipitate when conducted at temperatures of about 95–100° C. Thus when the organic halide is separated from uranyl fluoride solution by distillation, the aqueous solution at the end of the distillation is at or only slightly below the most suitable temperature for effecting the sodium uranate precipitation.

A further understanding of the invention may be secured from the following description of one embodiment thereof.

The numeral 1 designates a supply cylinder containing a mixture of uranium hexafluoride and organic halide. This cylinder is surrounded by a heater 2 for vaporizing the contents of the cylinder.

From cylinder 1 a vapor line 3 leads to the hydrolyzer 4. The hydrolyzer may be a closed tank constructed of nickel or Monel or other suitable material not seriously affected by the reagents involved. At the top of the hydrolyzer a rose type spray nozzle 5 or other suitable spray means drenching the top and walls of the hydrolyzer is provided. At the bottom an outlet 6 leads to a precipitation tank 7 and recirculating line 8. The latter line connects with a circulating pump 9 and heat exchanger 10 for controlling the temperature of the circulating liquid. From heat exchanger 10 a line 11 is provided for returning liquid to the spray nozzle 5.

From the top of hydrolyzer 4 a valve-controlled vapor line 12 leads to a condenser 13 for recovering organic halide distillate. The condenser 13 is connected by pipe 14 with a decanter 15 for separating the condensate into an aqueous phase and an organic phase. Vapor line 16 leads from condenser 13 to brine-cooled condenser 17 for removing final small quantities of volatile organic halide. The condensate from this condenser is returned to decanter 15 by line 14a.

Precipitation tank 7 may be an open or closed vessel constructed of wood or nickel or other material resistant to the solution. It is provided with an outlet 19 leading to filter 20.

Steam inlets 21 and 22 and caustic solution inlets 23 and 24 are provided on tanks 4 and 7. Nitrogen inlet 25 and vent 26 are strategically located on lines 3 and 12 for sweeping out vapors from these vapor lines and hydrolyzer 4.

The use of this system for separating organic halide from uranium hexafluoride is illustrated by the following examples.

Example 1

A cylinder containing a mixture of about 85 parts by weight of uranium hexafluoride and 15 parts by weight of perfluoro-dimethyl-cyclohexane is heated by means of heater 2 to a temperature of 90–100° C. Into hydrolyzer 4, 164 pounds of aqueous 10% NaOH solution is introduced for each 100 pounds of the mixture to be treated. The solution is circulated through heat exchanger 10 by means of pump 9 and nitrogen is passed in at 25 and out at 26 to expel air from the system. When all air has been expelled from the system, the valve on the cylinder is opened to permit the vapors to pass from the cylinder into line 3 and thence into hydrolyzer 4 where they contact the spray of aqueous alkaline solution from nozzle 5. The perfluoro-dimethylcyclohexane condenses and the uranium hexafluoride reacts to form uranyl fluoride and sodium fluoride. The vapors are allowed to pass from cylinder 1 until the cylinder is empty. During this period cooling liquid is introduced into 10 as necessary to maintain the proper temperature in hydrolyzer 4 and the valve on line 12 is kept closed to prevent escape of vapors. When all of the mixture has passed out of cylinder 1, the pressure on hydrolyzer 4 (4–6 lbs. gauge) is vented by slowly opening the main valve on line 12, the valve to the cylinder is closed, and nitrogen is again introduced to expel vapors from line 3. At this point the recirculating system may be flushed with hot water if desired by adding the water through an inlet (not shown) on line 8. This step is not necessary to the process but protects the recirculating system.

The temperature in the hydrolyzer is then raised by passing steam into the reactor through inlet 21. Steam and perfluoro-dimethylcyclohexane vapor are condensed in condenser 13. Any uncondensed organic vapor is condensed in refrigerated condenser 17. Condensate from both condensers passes to decanter 15 where the heavy organic compound settles out beneath a smaller quantity of the lighter weight water. Any vapors entrapped by the condensate are vented to condenser 17.

When substantially all of the perfluoro-dimethylcyclohexane has distilled off from hydrolyzer 4, the aqueous solution is drained by way of outlet 6 to precipitation tank 7 and sufficient NaOH (about 40 pounds per 100 pounds of original $UF_6$ mixture), water, and steam are added to bring the pH of the solution to 10.0–10.5, the uranium concentration to about 5% by weight, and the temperature to approximately 95° C. After the solutions are thoroughly mixed, the solution and precipitate are withdrawn at 19 into filter 21 where aqueous solution is separated from solid matter.

The solid sodium uranate thus recovered is free from organic impurities and may be used as such or converted to other uranium products.

Example 2

A mixture of uranium hexafluoride and perfluoro-dimethylcyclohexane is hydrolyzed in aqueous sodium hydroxide solution in the same manner as described in Example 1. After steam distilling the perfluoro-dimethylcyclohexane from the hydrolyzer, a substantially neutral solution of uranyl oxyfluoride remains behind.

11,456 parts by weight of this solution, which contains approximately 3.39 mols of uranium and 13.6 mols of sodium fluoride is acidified with 2,042 parts by weight of aqueous 37% hydrochloric acid. The acidified solution is maintained at 33–36° C. and agitated while 590 parts by weight of sodium hyposulfite ($Na_2S_2O_4$) are added in a period of 45 minutes. The solution now gives a negative test for uranyl ions. The precipitate is washed five times by decantation with 10,000 parts by weight of water for each wash. Finally it is separated from wash liquor by filtration and dried at 80° C. Yield, 1338 parts by weight. Analysis: Uranium 61.5%, fluorine 27.1%. Probable constitution: $NaF \cdot UF_4$.

It will be understood that we intend to include variations and modifications of the invention and that the preceding examples are illustrations only and in no wise to be construed as limitations upon the invention, the scope of which is defined in the appended claims, wherein—

We claim:

1. The method of recovering uranium values and a saturated perhalocarbon containing from 7 to 8 carbon atoms in which the halogen substituents are selected from the group consisting of fluorine and chlorine and which contains no more than 2 chlorine atoms per molecule from a mixture of uranium hexafluoride and said saturated perhalocarbon which comprises treating the mixture with sufficient water to form an aqueous uranyl fluoride solution, separating said saturated perhalocarbon from the solution, and then treating the solution to precipitate the uranium as a water-insoluble compound.

2. The method of recovering uranium values and a saturated perhalocarbon containing from 7 to 8 carbon atoms in which the halogen substituents are selected from the group consisting of fluorine and chlorine and which contains no more than 2 chlorine atoms per molecule from a mixture of uranium hexafluoride and said saturated perhalocarbon which comprises treating the mixture in a closed system with sufficient water and alkaline compound to form an aqueous uranyl fluoride solution having a pH between 7 and 8, steam distilling said saturated perhalocarbon from the solution, and then treating the solution to precipitate the uranium as a water-insoluble compound.

3. The method of recovering uranium values and a saturated perhalocarbon containing from 7 to 8 carbon atoms in which the halogen substituents are selected from the group consisting of fluorine and chlorine and which contains no more than 2 chlorine atoms per molecule from a mixture of uranium hexafluoride and said saturated perhalocarbon which comprises treating the mixture with sufficient water to form an aqueous uranyl fluoride solution, separating said saturated perhalocarbon from the solution, and then adding an alkaline compound to precipitate the uranium as an alkaline uranate and to retain the fluorine in the solution as an alkaline fluoride.

4. The method of recovering uranium values and a saturated perhalocarbon containing from 7 to 8 carbon atoms in which the halogen substituents are selected from the group consisting of fluorine and chlorine and which contains no more than 2 chlorine atoms per molecule from a mixture of uranium hexafluoride and said saturated perhalocarbon which comprises treating the mixture with sufficient water and alkali to form an aqueous uranyl fluoride solution having a pH between 7 and 8, steam distilling said saturated perhalocarbon from the solution and then adding an alkali-metal hydroxide to precipitate the uranium as alkali-metal uranate and to retain the fluorine in the solution as alkali-metal fluoride.

5. The method of recovering uranium values and a saturated perhalocarbon containing from 7 to 8 carbon atoms in which the halogen substituents are selected from the group consisting of fluorine and chlorine and which contains no more than 2 chlorine atoms per molecule from a mixture of uranium hexafluoride and a said saturated perhalocarbon which comprises treating the mixture with sufficient water to form an aqueous uranyl fluoride solution, separating said saturated perhalocarbon from the solution, and then treating the solution with a reducing agent to precipitate the uranium as a fluorine compound of tetravalent uranium.

6. The method of recovering uranium values and a saturated perhalocarbon containing from 7 to 8 carbon atoms in which the halogen substituents are selected from the group consisting of fluorine and chlorine and which contains no more than 2 chlorine atoms per molecule from a mixture of uranium hexafluoride and said saturated perhalocarbon which comprises treating the mixture with sufficient water and alkali to form an aqueous uranyl fluoride solution having a pH between 7 and 8, steam distilling said saturated perhalocarbon from the solution, thereafter acidifying the solution, and treating it with a reducing agent to precipitate the uranium as a fluorine compound of tetravalent uranium.

7. A method as recited in claim 1 wherein the saturated perhalocarbon is perfluoro-dimethyl-cyclohexane.

8. A method as recited in claim 2 wherein the alkaline compound is an alkali metal hydroxide.

9. A method as recited in claim 3 wherein cooling is carried out as the mixture is being treated with water to form an aqueous uranyl fluoride solution.

10. A method as recited in claim 4 wherein the saturated perhalocarbon is perfluoro-dimethyl-cyclohexane.

11. A method as recited in claim 5 wherein the reducing agent is one selected from the group consisting of tin, stannous chloride, aluminum and hyposulfurous acid.

12. A method as recited in claim 6 wherein the saturated perhalocarbon is perfluoro-dimethyl-cyclohexane, the alkali is an alkali metal hydroxide, the solution is acidified with hydrochloric acid, and the reducing agent is hyposulfurous acid formed in situ by reaction of added sodium hyposulfite with excess hydrochloric acid.

References Cited in the file of this patent

Mellor: "Comprehensive Treatise on Inorganic and Theoretical Chemistry," vol. 12, 1932, pages 75 and 76.